(12) United States Patent
Krüger et al.

(10) Patent No.: US 9,702,343 B2
(45) Date of Patent: Jul. 11, 2017

(54) METHOD AND ARRANGEMENT FOR SWIFT POWER REGULATION

(71) Applicant: VESTAS WIND SYSTEMS A/S, Aarhus N (DK)

(72) Inventors: Thomas Krüger, Tilst (DK); Fabio Caponetti, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 35 days.

(21) Appl. No.: 14/649,865

(22) PCT Filed: Dec. 4, 2013

(86) PCT No.: PCT/DK2013/050409
§ 371 (c)(1),
(2) Date: Jun. 4, 2015

(87) PCT Pub. No.: WO2014/090255
PCT Pub. Date: Jun. 19, 2014

(65) Prior Publication Data
US 2015/0330363 A1 Nov. 19, 2015

(30) Foreign Application Priority Data
Dec. 14, 2012 (DK) .......................... PA 2012 70785

(51) Int. Cl.
*F03D 7/02* (2006.01)
*F03D 7/04* (2006.01)
(Continued)

(52) U.S. Cl.
CPC .......... *F03D 7/0284* (2013.01); *F03D 7/048* (2013.01); *F03D 9/257* (2017.02);
(Continued)

(58) Field of Classification Search
CPC ........ F03D 7/0284; F03D 9/005; F03D 7/048; F03D 9/257
(Continued)

(56) References Cited

U.S. PATENT DOCUMENTS

2009/0295162 A1* 12/2009 Oohara ................... F03D 7/028
290/44
2011/0172837 A1 7/2011 Forbes, Jr.
(Continued)

FOREIGN PATENT DOCUMENTS

| EP | 2166225 A1 | 3/2010 |
|---|---|---|
| EP | 2458205 A1 | 5/2012 |
| EP | 2527647 A1 | 11/2012 |

OTHER PUBLICATIONS

International Search Report for PCT/DK2013/050409, Feb. 5, 2005.
Danish Search Report for PA 2012 70785, Jul. 30, 2013.

*Primary Examiner* — Viet Nguyen
(74) *Attorney, Agent, or Firm* — Patterson + Sheridan, LLP

(57) ABSTRACT

The present invention relates to a method for regulating a flow of power between a wind power facility and a power grid connected thereto. The method comprises the steps of determining whether power is to be delivered to or absorbed from the power grid, and at least partly disabling or at least partly enabling one or more power consuming auxiliary systems in response to said determination. Moreover, an arrangement for delivering additional power to a power grid is provided.

22 Claims, 2 Drawing Sheets

(51) Int. Cl.
*F03D 9/00* (2016.01)
*F03D 9/25* (2016.01)

(52) U.S. Cl.
CPC ... *F05B 2270/337* (2013.01); *F05B 2270/602* (2013.01); *Y02E 10/723* (2013.01)

(58) Field of Classification Search
USPC .................................................. 290/44, 55
See application file for complete search history.

(56) References Cited

U.S. PATENT DOCUMENTS

| | | | | |
|---|---|---|---|---|
| 2011/0175355 A1* | 7/2011 | Rosenvard | ............. | F03D 7/048 290/44 |
| 2012/0104755 A1* | 5/2012 | Hashimoto | ........... | F03D 7/0284 290/44 |
| 2012/0104756 A1 | 5/2012 | Beekmann et al. | | |
| 2012/0133133 A1* | 5/2012 | Bager | .................. | F03D 7/0284 290/44 |
| 2012/0203384 A1* | 8/2012 | Arlaban Gabeiras | ..... | H02J 3/06 700/286 |
| 2013/0270823 A1* | 10/2013 | Hannon | ................ | F03D 7/0264 290/44 |
| 2014/0225369 A1* | 8/2014 | Bodewes | ................. | F03D 7/04 290/44 |

\* cited by examiner

METHOD AND ARRANGEMENT FOR SWIFT POWER REGULATION

FIELD OF THE INVENTION

The present invention relates to a method and an arrangement for swift power regulation between a wind power facility and a power grid connected thereto. The wind power facility may involve a single wind turbine or a plurality of wind turbines forming a wind power plant (WPP).

BACKGROUND OF THE INVENTION

Renewable energy sources, such as wind turbines, have become a significant contributor to the daily energy supply. Electrical energy generated by wind turbines are fed into AC power grids and thereby distributed to the various energy consumers.

In case of a power grid failure causing a frequency drop a swift power boost may be required in order to stabilise the power grid. It is well-known that such power boosts may be provided by wind turbines being operated in a curtailed mode of operation. Thus, if a number of wind turbines are operated in a curtailed mode of 90% the remaining 10% of power may be boosted into the grid in the event of a grid failure in order to stabilise the grid. However, if the wind turbines are already operated at nominal power levels no extra power is available for grid stabilisation. Moreover, inertia emulation where wind turbines are operated above their nominal power levels for a short period of time may be applied for grid stabilisation.

However, it is generally costly and inefficient to operate wind turbines in a curtailed mode of operation. The reason for this being that curtailed wind turbines are operated below their nominal power ratings. Moreover, the capability of inertia emulation is rather low. The reason for this being that inertia emulation comes at the cost of a rotational speed drop and a power drop after a power boost. Eventually, this may destroy grid stabilization.

It may be seen as an object of embodiments of the present invention to provide an effective and a swift power regulation scheme in order to deliver/absorb power to/from a power grid connected to a wind power facility, such as a wind turbine or a WPP.

It may be seen as a further object of embodiments of the present invention to provide a swift power regulation scheme in order to stabilise a power grid in the event of a grid failure.

DESCRIPTION OF THE INVENTION

The above-mentioned objects are complied with by providing, in a first aspect, a method for regulating a flow of power between a wind power facility and a power grid connected thereto, the method comprising the steps of
  operating the wind power facility at an essentially rated power level,
  determining whether power is to be delivered to or absorbed from the power grid, and
  at least partly disabling or at least partly enabling one or more power consuming auxiliary systems in response to said determination.

In a first embodiment, additional power may be delivered to the power grid by at least partly disabling one or more auxiliary systems. The term "additional power" is here to be understood as an additional power level or a power boost which is provided on top of the amount of power delivered to the power grid during normal operation of the wind power facility. In a second embodiment, surplus power available on the power grid may be absorbed by at least partly enabling one or more auxiliary systems.

The term "essentially rated power level" is to be understood as a power level that is close to the rated power level of the wind turbine facility at a given wind speed. Thus, power levels which are for example within 15%, such as within 10%, such as within 5%, such as within 3% of the rated power level of the wind turbine facility are to be considered as being at an essentially rated power level at the actual wind speed.

Firstly, the embodiment where additional power is to be delivered from the wind power facility to the power grid connected thereto is disclosed. In this scenario the power delivering process may comprise the steps of
  at least partly disabling one or more power consuming auxiliary systems of the wind power facility in order to save power, and
  delivering at least part of the saved power to the power grid as additional power.

Thus, by at least partly disabling one or more power consuming auxiliary systems within the wind turbine facility a certain amount of power is saved, i.e. not consumed by the auxiliary system(s). Thus, by saving a certain amount of power within the wind turbine facility a surplus amount of power becomes available for other purposes. This saved amount of power may advantageously be delivered to the power grid instead as an additional level of power or a power boost for grid stabilisation in the event of for example a power grid failure.

The term wind power facility should be understood broadly. Thus, a wind power facility may be a group of wind turbines forming a WPP, or it may be a single wind turbine. The wind power facility is connected to the power grid via a so-called point of common coupling (PCC). The overall operation of a WPP may be controlled by a power plant controller (PPC), whereas the operation of a single wind turbine may be controlled by a wind turbine controller.

It is an advantage of the first embodiment of the present invention that a swift power boost may be made available for the power grid in a very simple and cost effective way. The method may be applied as a fast, but limited, overrate operational mode or as a tool for establishing power grid stabilisation in the event of a grid failure. Moreover, the method may be implemented on existing WPPs or wind turbines.

Various scenarios or events may release an immediate need for power. For example a grid failure may lower the grid frequency to unacceptable values if no swift power delivery to the grid is initiated.

The power consuming auxiliary systems of the wind power facility may in principle be any of the power consuming systems that ensure proper, effective and safe operation of the wind power facility. Thus, in the present context auxiliary systems are to be understood as cooling systems for gearboxes, generators etc., hydraulic or electrical systems for pitch and yaw, alarm and control systems etc.

The step of at least partly disabling one or more power consuming auxiliary systems may involve a complete disabling, i.e. close down, of one or more power consuming auxiliary systems of the wind power facility. Typically, a complete close down of the major auxiliary systems of a 3 MW wind turbine may save an amount of power corresponding to 30-50 kW. This amount of saved and thereby available power, or at least part thereof, may be delivered to the power grid as additional power in order to stabilize the grid.

All power consuming auxiliary systems of the wind power facility may be disabled if demands so require. The power consuming auxiliary systems may be disabled in a relative short, but variable period of time. Also, the disabling may be performed in accordance with a predetermined procedure, such as by disabling the auxiliary systems in accordance with their power consumption. Typically, this period is only a few minutes, but it may also be shorter than 120 seconds, such as shorter than 90 seconds, such as shorter than 60 seconds, such as shorter than 30 seconds.

Regarding the cooling system the thermal time constant of said system may set an upper limit for the before-mentioned time period. In order to avoid hot spots within the wind turbine facility mathematical models may be applied to predict the temperatures of the various key components (generator, gearbox, hydraulic oil etc.) during disabling of the cooling system. Thus, mathematical models may be applied in order to calculate an expected allowable downtime of the cooling system if hot spots are to be avoided.

The additional power to be delivered to the power grid may comprise active or reactive power depending on the specific situation. When the grid situation is normalised and no additional power is required anymore the disabled auxiliary systems of the wind power facility may be enabled all at once, or they may be enabled in steps, such as one auxiliary system at the time.

In the second embodiment of the present invention power is to be transferred from the power grid to the wind power facility and subsequent absorbed therein. The power absorbing process may comprise the step of at least partly enabling one or more power consuming auxiliary systems of the wind power facility in order to consume surplus power available on the power grid. Thus, one or more power consuming auxiliary systems of the wind power facility may be enabled, or alternatively all power consuming auxiliary systems of the wind power facility may be enabled, in order to maximise power consumption.

The power absorbing process may optionally be supplemented by activation of a number of available dump loads or power reservoirs. This scenario may occur in connection with low-voltage ride through (LVRT) situations. The auxiliary systems relevant in connection with this second embodiment are the same as disclosed in connection with the first embodiment. Also, the principles of the implementations of the above-mentioned disabling processes generally also apply in connection with the enabling processes of this second embodiment.

In a second aspect the present invention relates to a method for absorbing power from a power grid within a wind power facility connected thereto, the method comprising the steps of
  determining whether power is to be absorbed from the power grid, and
  at least partly enabling one or more power consuming auxiliary systems in response to said determination.

The power absorbing process may comprise the step of at least partly enabling one or more power consuming auxiliary systems of the wind power facility in order to consume surplus power from the power grid. In fact one or more power consuming auxiliary systems of the wind power facility may be enabled. Alternatively, all power consuming auxiliary systems of the wind power facility may be enabled in order to maximise power consumption.

The power consuming auxiliary systems may be enabled in a relative short, but variable period of time. Also, the enabling may be performed in accordance with a predetermined procedure, such as by enabling the auxiliary systems in accordance with their power consumption. Typically, the period of enabling is only a few minutes, but it may also be shorter than 120 seconds, such as shorter than 90 seconds, such as shorter than 60 seconds, such as shorter than 30 seconds.

In the present context the power consuming auxiliary systems to be enabled may in principle be any of the power consuming systems of the wind power facility. Thus, in the present context auxiliary systems are to be understood as cooling systems for gearboxes, generators etc., hydraulic or electrical systems for pitch and yaw, alarm and control systems etc.

In a third aspect the present invention relates to an arrangement for delivering additional power from a wind power facility to a power grid connected thereto when said wind power facility is operated at an essentially rated power level, the arrangement comprising
  a controller for at least partly disabling one or more power consuming auxiliary systems of the wind power facility in order to save power, and
  device for delivering at least part of the saved power to the power grid as additional power.

Thus, the arrangement of the third aspect is adapted to perform the method of the first embodiment of the first aspect where a saved, and thereby available, amount of power is delivered to the power grid. The term "essentially rated power level" is defined above.

Again, the term "additional power" is to be understood as an additional power level or a power boost which is provided on top of the amount of power delivered to the power grid during normal operation of the wind power facility.

Again, the term wind power facility should be understood broadly in that it may refer to a WPP, or it may refer to a single wind turbine. The wind power facility is connected to the power grid via a PCC. In case the wind power facility involves a WPP the controller may involve a PPC. Similarly, in case of a single wind turbine the controller may involve a wind turbine controller.

The controller may be adapted to disable, i.e. close down, one or more power consuming auxiliary systems of the wind power facility. This complete disabling may be performed in accordance with a predetermined procedure, such as by disabling the auxiliary systems in accordance with their power consumption.

As stated previously, a complete close down of the major auxiliary systems of a 3 MW wind turbine may typically save around 30-50 kW. A similar amount of power, or at least part thereof, may instead be delivered to the power grid as additional power in order to stabilize said grid.

Similar to the first aspect, the auxiliary systems of the wind power facility may in principle be any of the power consuming systems of the facility, i.e. cooling systems, hydraulic systems, controllers etc. These auxiliary systems may be disabled and/or enabled individually or in groups depending on the specific situation.

As previously stated the thermal time constant of the cooling system may set an upper limit for the downtime of said cooling system. In order to avoid hot spots within the wind turbine facility mathematical models may be applied to predict the temperatures of the various key components (generator, gearbox, hydraulic oil etc.) during disabling of the cooling system. Thus, mathematical models may be applied in order to calculate an expected allowable downtime of the cooling system if hot spots are to be avoided.

In a third aspect the present invention relates to a wind power facility comprising an arrangement according to the second aspect, said wind turbine facility comprising one or more wind turbines.

BRIEF DESCRIPTION OF THE DRAWINGS

The present invention will now be described in further details with reference to the accompanying figures, where.

Figure 1:
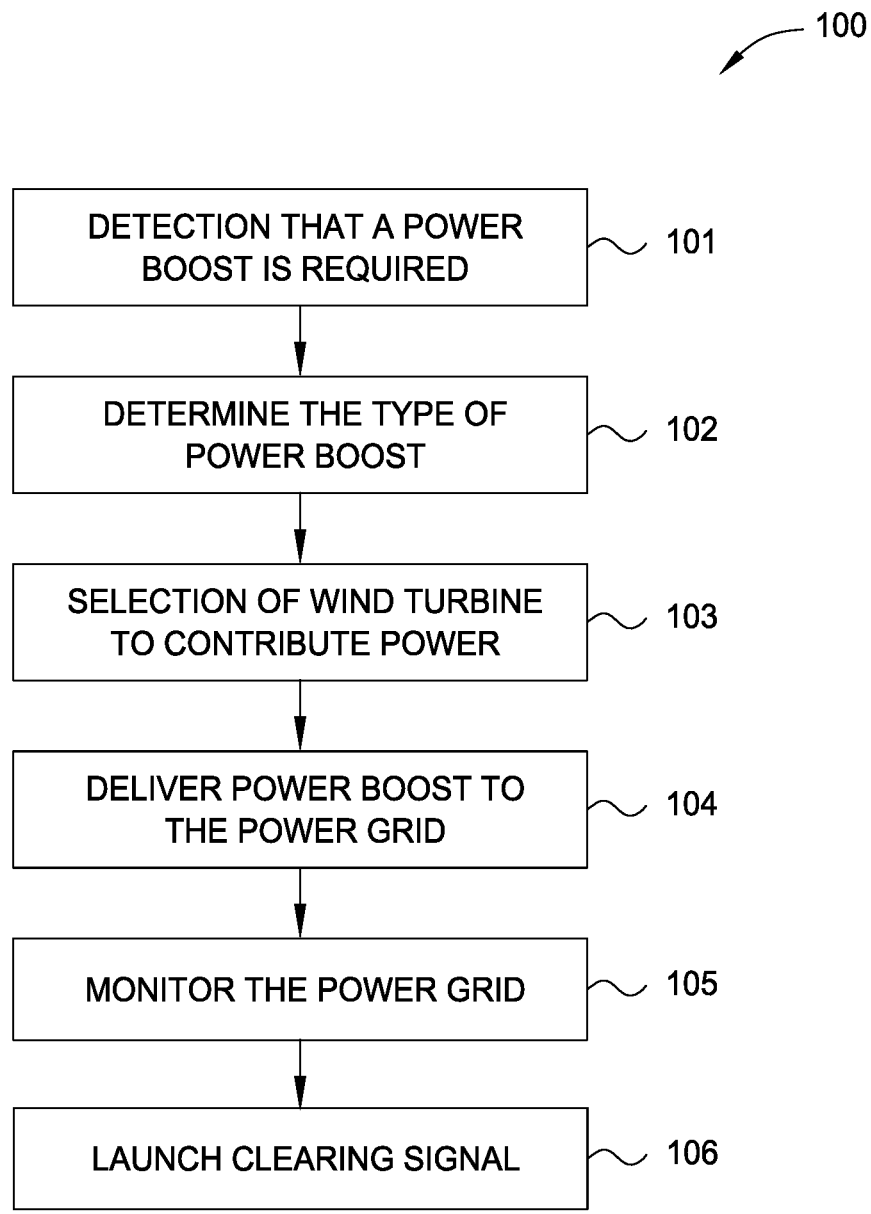
FIG. 1 shows a flow-chart of a method of the present invention.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its most generally aspect the present invention relates to a method for 1) a swift delivery of additional electrical power from a wind power facility to a power grid connected thereto, or 2) a swift absorption of electrical surplus power from said a power grid. In the following the invention will be disclosed with reference to embodiment 1), i.e. a swift power delivery from the wind power facility to the power grid. It should be noted however, that disabling and enabling of power consuming auxiliary systems may be implemented by following similar design routes. For that reason the disclosure of embodiment 1) generally also applies to embodiment 2), i.e. swift absorption of electrical surplus power from said a power grid.

Regarding embodiment 1) the wind turbine facility is operated at an essentially rated power level at the actual wind speed. As stated previously the term "essentially rated power level" is to be understood as a power level that is close to the rated power level of the wind turbine facility at a given wind speed. Thus, power levels which for example are within 15%, such as within 10%, such as within 5%, such as within 3% of the rated power level of the wind turbine facility are to be considered as being at an essentially rated power level at a given wind speed. Regarding embodiment 2) the wind turbine facility may not necessary be operated at an essentially rated power level. Operating the wind turbine facility at for example lower power levels may be relevant as well.

The method according to a first embodiment implies that power is saved by reducing the wind power facility's own consumption of power. The saved amount of power, or at least part thereof, is swiftly delivered to the power grid as additional power for boosting or stability purposes, the latter typically being in connection with a grid fault.

Depending on the type of grid fault the delivered additional power may be either active or reactive power. For example, if the grid frequency falls below a predetermined level, such as 5% below the nominal grid frequency, additional active power may be injected into the power grid in order to increase, or at least stabilize, the grid frequency. Alternatively, if the grid voltage falls below a predetermined voltage level, such as 10% below the nominal grid voltage, additional reactive power may be injected into the power grid in order to increase, or at least stabilize, the grid voltage. Obviously, the before-mentioned predetermined levels (frequency and voltage) may differ from the values mentioned.

Referring now to FIG. 1 a method according to the present invention is depicted in the form of a flow-chart 100. FIG. 1 relates to the general situation where a swift power boost in the form of additional power to the power grid is required. The reason for this requirement may in principle be arbitrary. However, a typical scenario may be a LVRT situation caused by a grid failure.

Figure 2:
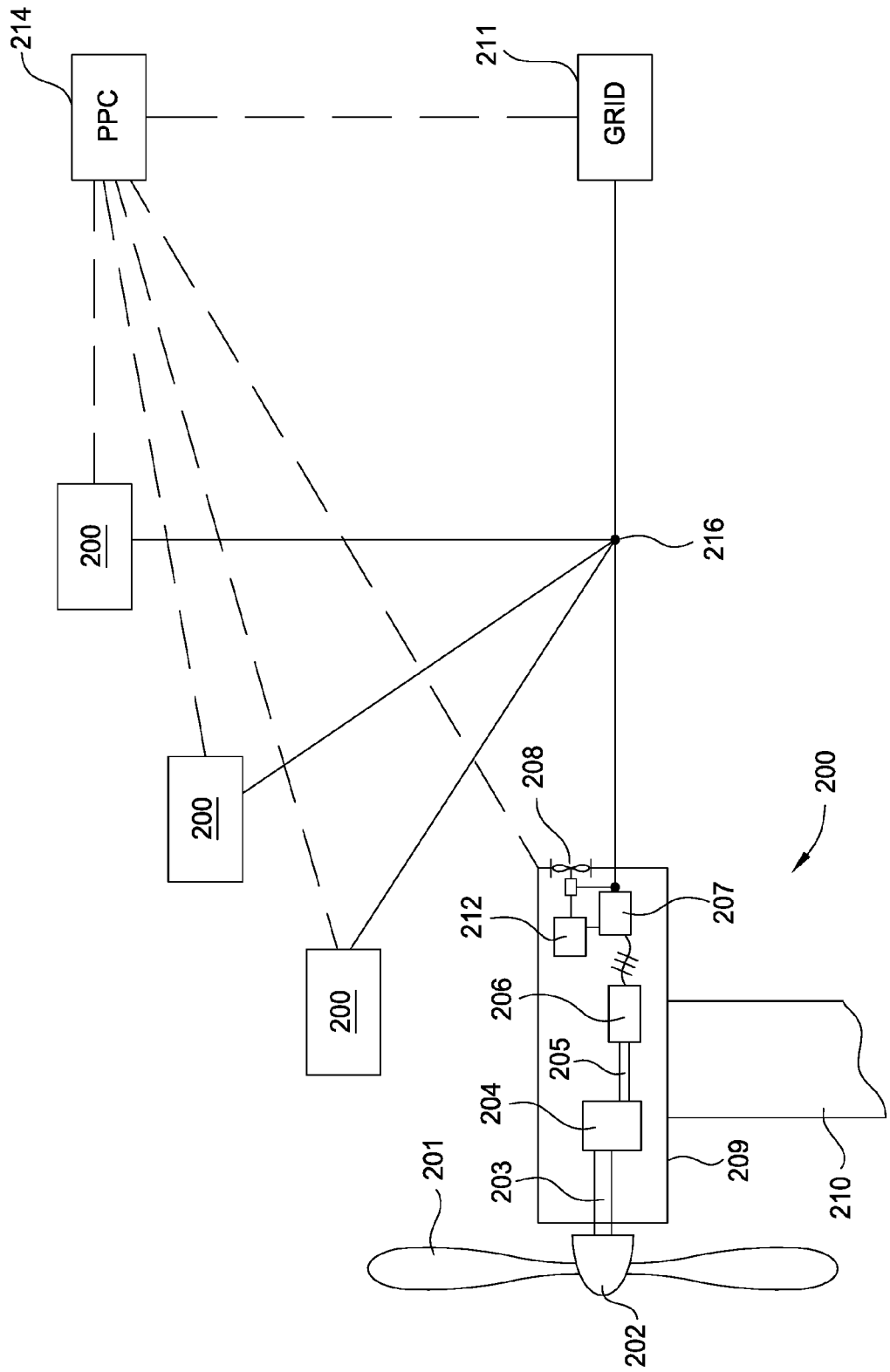
FIG. 2 shows a wind turbine including an arrangement according to the present invention.

As depicted in FIG. 1 the following steps are involved:
101: Detection that a power boost is required
102: Determine the type power boost (active or reactive power)
103: Selection of wind turbine(s) to contribute
104: Deliver power boost to the power grid
105: Monitor the power grid
106: Launch clearing signal The above-mentioned steps refer to the situation where the method is performed on a power plant level, i.e. in case the wind power facility is a WPP as shown in FIG. 2, and the required power boost is detected or determined by a PPC 214. The PPC 214 also determines the type of power, active or reactive, to be delivered to the power grid at a PCC 216.

Referring now to FIG. 2, the WPP 250 is formed by a number of wind turbines being interconnected by an electrical power grid. Each wind turbine 200 comprises a tower 210, a nacelle 209 and a set of rotatably mounted rotor blades 201 driving a generator 206 via an optional gearbox 204 and associated drive axles 203, 205. The rotor blades 201 are secured to a hub 202. The generator 206 may in principle be of any type, such as a doubly-fed or a permanent magnet generator arranged in a full-scale set-up. The generator feeds AC power to a power inverter 207 which is controlled by a wind turbine controller 212. The power inverter 207 generates an AC power output voltage which is suitable for being fed into the electrical power grid of the WPP 250, or fed directly into the power grid 211 optionally via a grid transformer (not shown). In case the wind power facility is a WPP 250 the PPC 214 controls the individual wind turbines controllers.

The power consuming auxiliary power systems typically consume AC from the output terminals of the power inverter 207 coupled to the generator 206. In FIG. 2 a power consuming auxiliary system is exemplified by the ventilation fan 208 which is controlled by wind turbine controller 212. Power is provided to the ventilation fan 208 from the power inverter 207. It should be noted however, that the auxiliary systems may be coupled to the power inverter 207 via one or more transformers (not shown) in order to provide a given AC voltage level, such as the operating AC voltage level(s) of the individual auxiliary system(s).

After verifying that a power boost in the form of additional power is needed the PPC 214 then selects and subsequently prompts the wind turbine or wind turbines that are assigned to contribute to the swift power delivery to the power grid 211. As previously stated the power boost is generated by lowering, or completely disabling, the internal power consumption within the selected wind turbine(s). The wind turbine(s) may be selected in accordance with a set of predetermined conditions, such as for example a list where the available wind turbines are listed in accordance with their respective power capabilities. However, other selection rules may be applicable as well.

A selected wind turbine may ignore a request from the PPC 214. Such a scenario may occur if the selected wind turbine is unable to lower its own power consumption. Another wind turbine of the power plant may be selected in replacement of the originally selected wind turbine.

In order to swiftly supply additional power to the power grid the auxiliary systems, such as the cooling system including hydraulic pumps, are at least partly disabled for a period of time. This period of time may typically be up to a few minutes.

The amount of available power that may be generated via power saving is typically in the range of some tens of kW for a 3 MW wind turbine. If the available amount of power by disabling the auxiliary systems is insufficient in a given situation further additional power may be generated temporary via power curtailment and/or inertia emulation of one or more wind turbines within the power plant—this including the wind turbine(s) with disabled auxiliary systems. The curtailment/inertia emulation based power is then added to the additional power generated via disabling of auxiliary systems.

When the grid conditions are normalised, i.e. when the grid frequency or the grid voltage has returned to its respective nominal ranges, the PPC 214 launches a clearing signal to the selected wind turbines whereby enabling of the auxiliary systems of the selected wind turbines may be initiated. The process of enabling the disabled auxiliary systems may be carried out in steps by enabling one auxiliary system at the time, or by enabling all auxiliary systems in a one-step process.

Still referring to FIG. 1 the fact that a power boost is required, see reference numeral 101, can be a result of a grid failure where either a drop in grid frequency or a grid voltage drop is detected by the PPC 214. In case of a grid failure the grid needs to be stabilized by delivering either additional active or reactive power to the power grid 211. Method steps 102-106 of FIG. 1 may be executed in order to stabilise the power grid when a grid failure has been detected.

The principles of the above-mentioned scheme for delivering additional power to a power grid, either as a general power boost or for stability purposes, also apply for individually operated wind turbines connected to a power grid. In this case the wind turbine controller performs the method illustrated in FIG. 1. Thus, the present invention finds its use both on a power plant level as well as on a single wind turbine level.

What is claimed is:

1. A method for regulating a flow of power between a wind power facility and a power grid connected thereto, the method comprising:
   determining whether power is to be delivered to or absorbed from the power grid,
   selecting one of a plurality of wind power facilities to deliver or absorb the power, wherein the selected wind power facility is operated at an essentially rated power level,
   determining, at the selected wind power facility whether to deny a request to deliver or absorb power based on whether one or more power consuming auxiliary systems on the selected wind power facility are capable of being enabled or disabled, and
   upon the selected wind power facility accepting the request, at least partly disabling or at least partly enabling the one or more power consuming auxiliary systems on the selected wind power facility to save power or consume power.

2. The method according to claim 1, wherein additional power is to be delivered from the wind power facility to the power grid connected thereto, said additional power delivering process comprising:
   at least partly disabling one or more power consuming auxiliary systems of the selected wind power facility in order to save power, and
   delivering at least part of the saved power to the power grid as additional power.

3. The method according to claim 2, further comprising disabling of one or more power consuming auxiliary systems of the selected wind power facility.

4. The method according to claim 3, wherein all power consuming auxiliary systems of the selected wind power facility are disabled.

5. The method according to claim 3, further comprising:
   determining the one or more power consuming auxiliary systems has been disabled for a maximum amount of time; and
   enabling the one or more power consuming auxiliary systems.

6. The method according to claim 1, wherein power is to be absorbed by the wind power facility, said power absorbing process comprises at least partly enabling one or more power consuming auxiliary systems of the selected wind power facility in order to consume surplus power from the power grid.

7. The method according to claim 6, wherein one or more power consuming auxiliary systems of the selected wind power facility are fully enabled.

8. The method according to claim 1, wherein the wind power facility forms part of a wind power plant.

9. The method according to claim 8, wherein a power plant controller disables the one or more power consuming auxiliary systems.

10. The method according to claim 9, wherein the power plant controller selects the at least one of a plurality of wind turbines of the wind power plant in accordance with a predetermined procedure.

11. The method according to claim 9, wherein the one or more power consuming auxiliary systems are disabled in accordance with a predetermined procedure.

12. The method according to claim 1, wherein the request is denied upon the selected wind power facility determining no additional auxiliary systems are capable of being enabled or disabled.

13. A method for absorbing power from a power grid within a wind power facility connected thereto, the method comprising:
   determining whether power is to be absorbed from the power grid,
   selecting one of a plurality of wind power facilities to absorb the power,
   determining, at the selected wind power facility, whether to deny a request to absorb power based on whether one or more power consuming auxiliary systems on the selected wind power facility are capable of being enabled, and
   upon the selected wind power facility accepting the request, at least partly enabling the one or more power consuming auxiliary systems on the selected wind power facility to consume power.

14. The method according to claim 13, wherein said power absorbing process comprises at least partly enabling one or more power consuming auxiliary systems of the selected wind power facility in order to consume surplus power from the power grid.

15. The method according to claim 14, wherein one or more power consuming auxiliary systems of the selected wind power facility are fully enabled.

16. The method according to claim 15, wherein all power consuming auxiliary systems of the selected wind power facility are enabled.

17. The method according to claim 13, wherein the request is denied upon the selected wind power facility determining no additional auxiliary systems are capable of being enabled.

18. An arrangement for delivering additional power from a wind power facility to a power grid connected thereto, wherein the wind power facility is operated at an essentially rated power level, the arrangement comprising:
a controller configured to:
receive a request to deliver power to the grid,
determine whether to deny a request to deliver power to the power grid based on whether one or more power consuming auxiliary systems on the wind power facility are capable of being disabled, and
upon accepting the request to deliver power, at least partly disable the one or more power consuming auxiliary systems of the wind power facility on the selected wind power facility to save power.

19. The arrangement according to claim 18, wherein the controller forms part of a wind turbine controller.

20. A wind power facility comprising an arrangement according to claim 18.

21. The arrangement according to claim 18, further comprising a power plant controller configured to:
select one of a plurality of wind power facilities to deliver the power, and
at least partly disable the one or more power consuming auxiliary systems.

22. The system according to claim 18, wherein the request is denied upon the selected wind power facility determining no additional auxiliary systems are capable of being disabled.

* * * * *